United States Patent

Albers et al.

Patent Number: 5,818,591
Date of Patent: Oct. 6, 1998

[54] TAILORING THE RLG MIRROR LIFETIME BY CHANGING THE MIRROR TO PLASMA DISTANCE SPACING

[75] Inventors: Steven C. Albers, Coon Rapids; Timothy J. Callaghan, Roseville; Rodney H. Thorland, Shoreview, all of Minn.

[73] Assignee: Honeywell Inc., Minneapolis, Minn.

[21] Appl. No.: 979,247

[22] Filed: Nov. 26, 1997

[51] Int. Cl.$^6$ ................................................. G01C 19/66
[52] U.S. Cl. ............................................................ 356/350
[58] Field of Search .............................................. 356/350

[56] References Cited

U.S. PATENT DOCUMENTS 5,719,675  2/1998  Killpatrick et al. ..................... 356/350

Primary Examiner—Vincent P. McGraw
Attorney, Agent, or Firm—Albert K. Kau

[57] ABSTRACT

Mirrors are tested separately at different distances to plasma in separate ring laser gyros. Testing mirrors a predetermined distance away from plasma in the gyros allows accelerated testing of the environment of the mirrors in gyros. The test results are graphed to also allow prediction of ring laser gyro life.

24 Claims, 7 Drawing Sheets

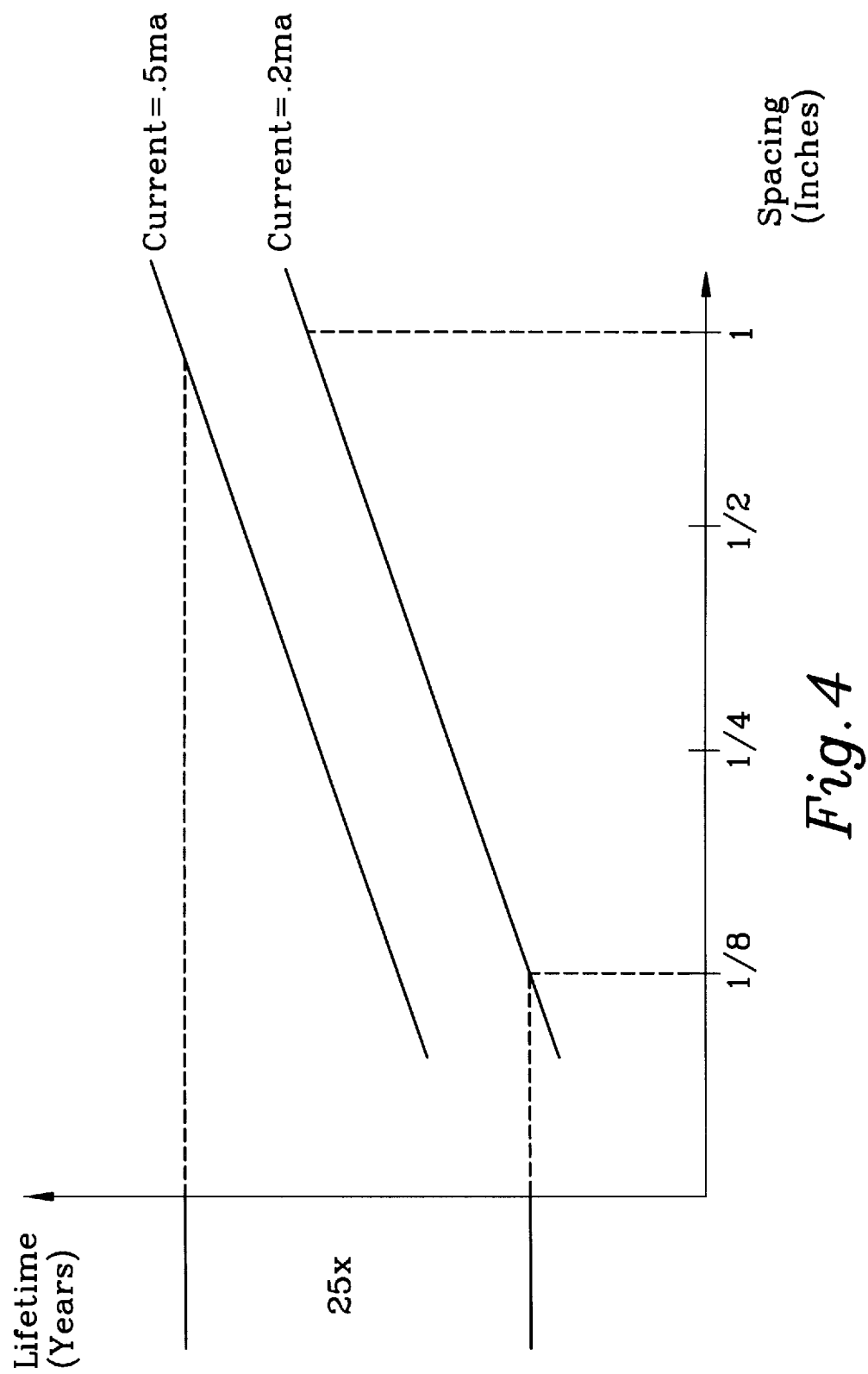

TAILORING THE RLG MIRROR LIFETIME BY CHANGING THE MIRROR TO PLASMA DISTANCE SPACING

BACKGROUND OF THE INVENTION

In ring laser gyros it is important for obvious reasons to have a gyro with a long lifetime. In ring laser gyros, helium neon plasma is introduced into a ring laser gyro block to create lasing in the ring laser gyro. The plasma discharge current travels from the anodes on the sides of the ring laser gyro to the cathode of the ring laser gyro. Mirrors are placed at the ends of the ring laser gyro block to keep laser beams, created by the lasing, traveling in the block for ring laser gyro operation. Some of the mirrors will be placed between the anode and cathode with the result that the plasma passes by these mirrors. However, as is known in this area of technology, plasma degrades the mirrors due to a photochemical process. Therefore, it is very important to improve the environment of the ring laser gyro with respect to the mirrors.

Presently, the process to test the mirror environment is by increasing the plasma discharge current. A discharge current of about 0.5 ma is introduced at the anode. In the present method of accelerating the testing, a higher discharge current such as 2 ma, for example, is used. Once the ring laser mirror ages, the lifetime of the ring laser gyro is recorded. FIG. 1 shows a graph of the recorded results from this discharge current test method. With this accelerated test, the life test of the ring laser gyro can be shortened by a factor of four. However, a problem with this approach exists. The discharge current test method is a near linear effect which still requires an extended period of time to determine the life of the mirrors in the ring laser gyro. It would be beneficial in saving time, money and energy if a more highly accelerated environment test was available to determine the life of mirrors in a ring laser gyro.

SUMMARY OF INVENTION

Testing mirrors a predetermined distance away from the plasma in ring laser gyros allows accelerated testing of the environment of the mirrors in gyros. The mirrors are tested separately at different distances to the plasma in the ring laser gyro. Data is gathered and graphed to show the relationship between the distance and the life of the ring laser gyro. This accelerated method of testing is due to the near square relationship that exists between the distance of the mirror placement to the plasma and the extension of life of the ring laser gyro as a result of the mirror placement away from the plasma. By augmenting the discharge current test method with this plasma spacing test method, a greatly accelerated test is easily achievable.

DETAILED DESCRIPTION OF THE PRESENT INVENTION

Figure 1:
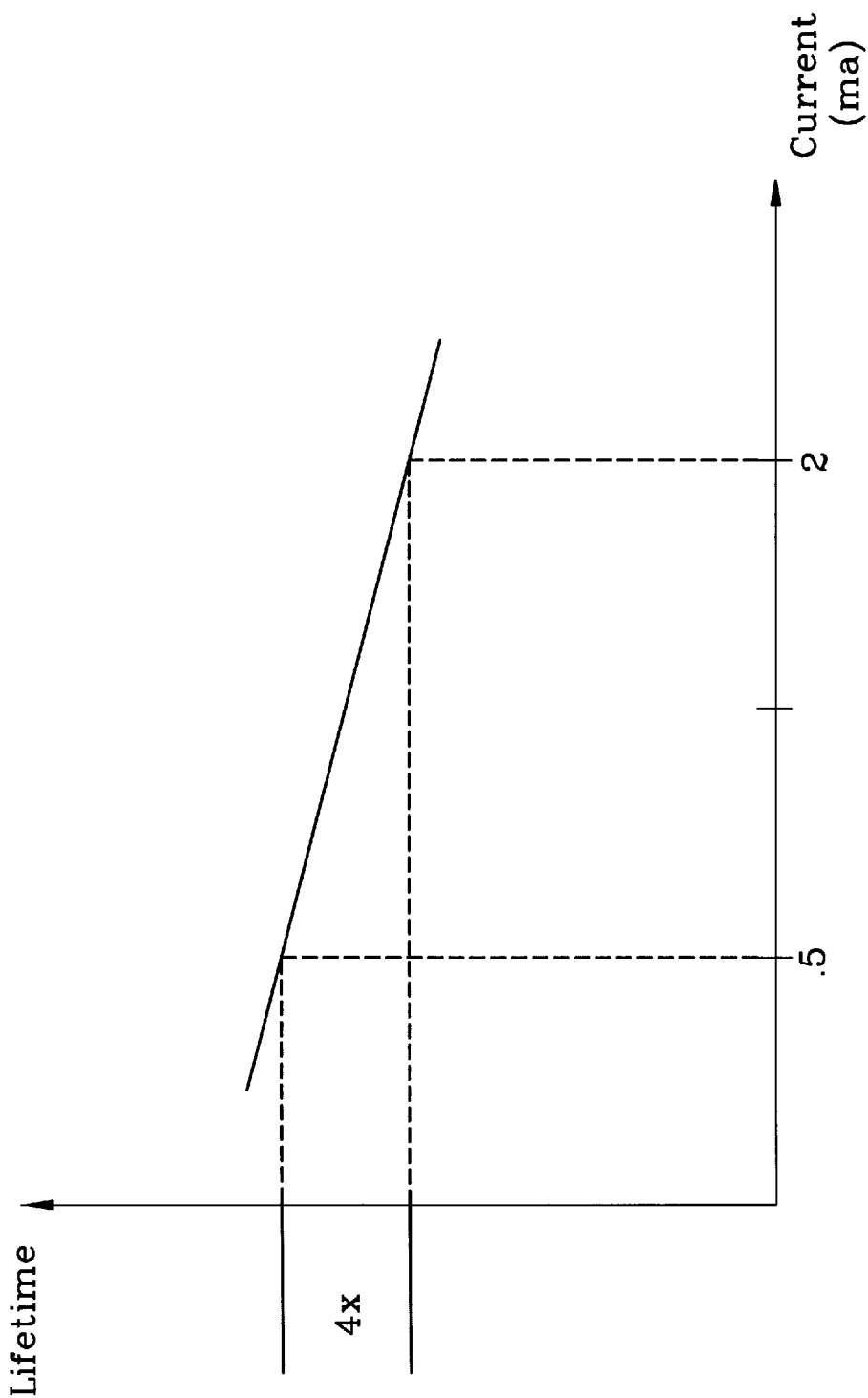
FIG. 1 shows a graph of results from the discharge current test method.
Figure 2:
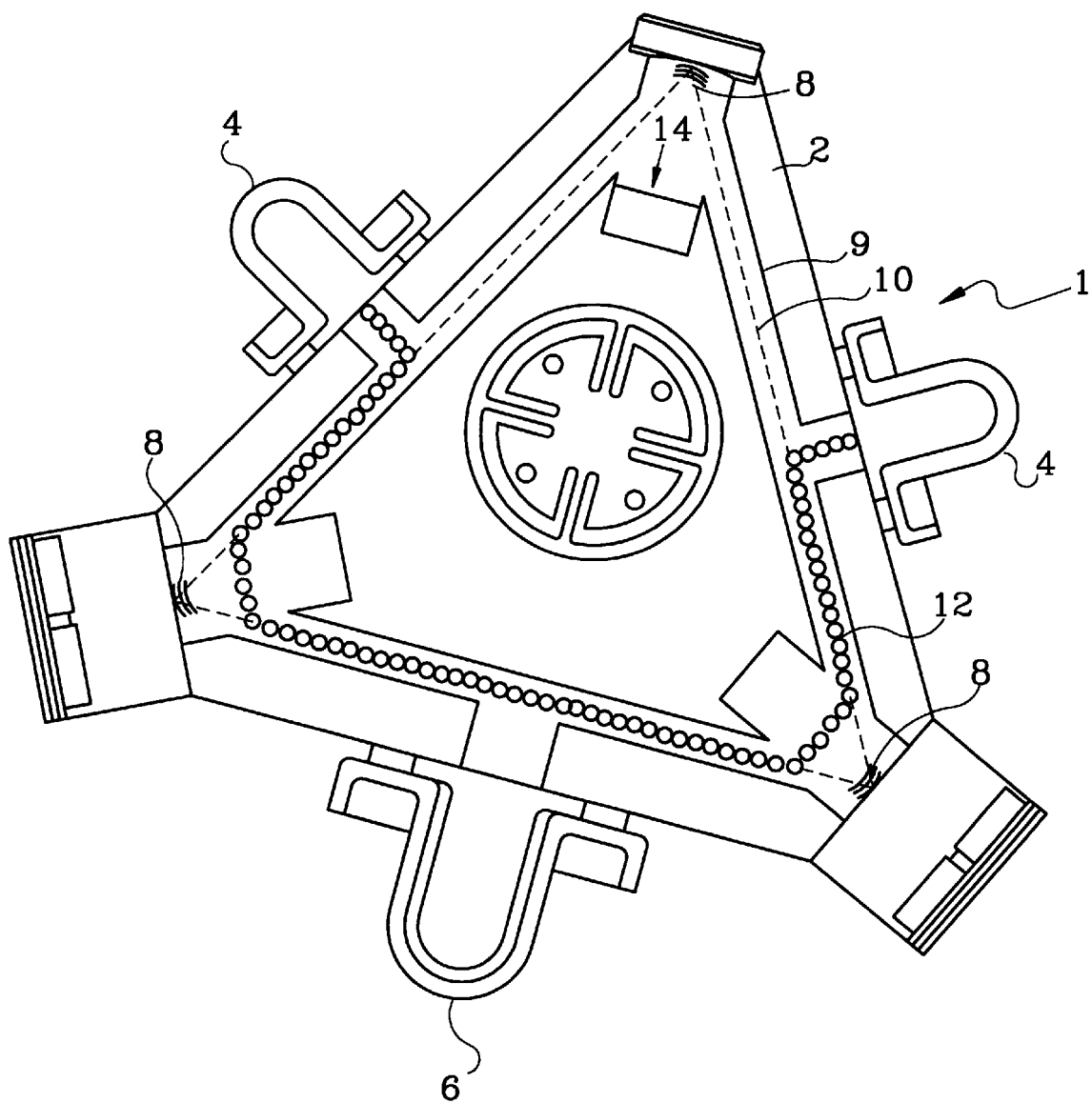
FIG. 2 shows a top cut away view of the ring laser gyro testing configuration of the present invention.

FIG. 2 shows the internal configuration of the ring laser gyro 1. Pathways 9 exist internal to the ring laser gyro block 2 from one end of the ring laser gyro 1 to another. Current is introduced into the ring laser gyro block 2 at one of the anodes 4 for the operation of the ring laser gyro 1. The current travels from the anodes 4 to the cathode 6 and due to a chemical reaction with gas existing in the ring laser gyro block 2, plasma 12 is created. In the past known configurations, the mirror 8 is spaced approximately an inch from the plasma 12. The test of the present invention runs ring laser gyros 1 with the mirrors 8 spaced from the plasma 12 at different distances and currents.

Figure 3A:
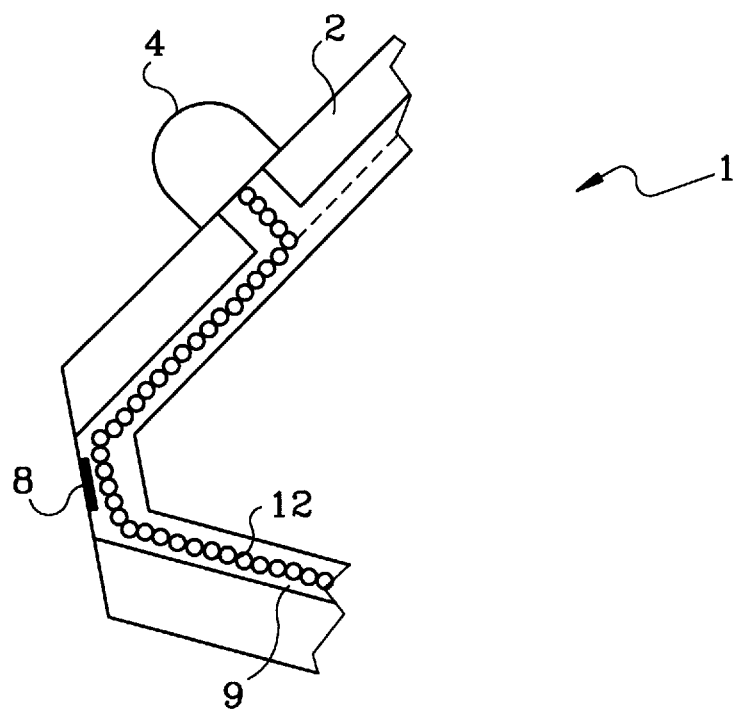
FIGS. 3a–3d show expanded views of the area containing the mirror and the plasma in a ring laser gyro.
Figure 3B:
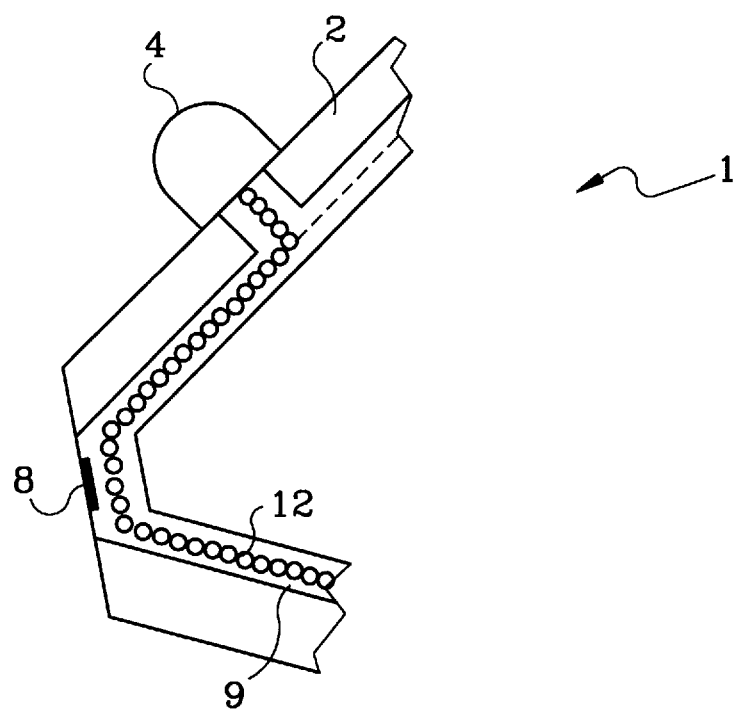
Figure 3C:
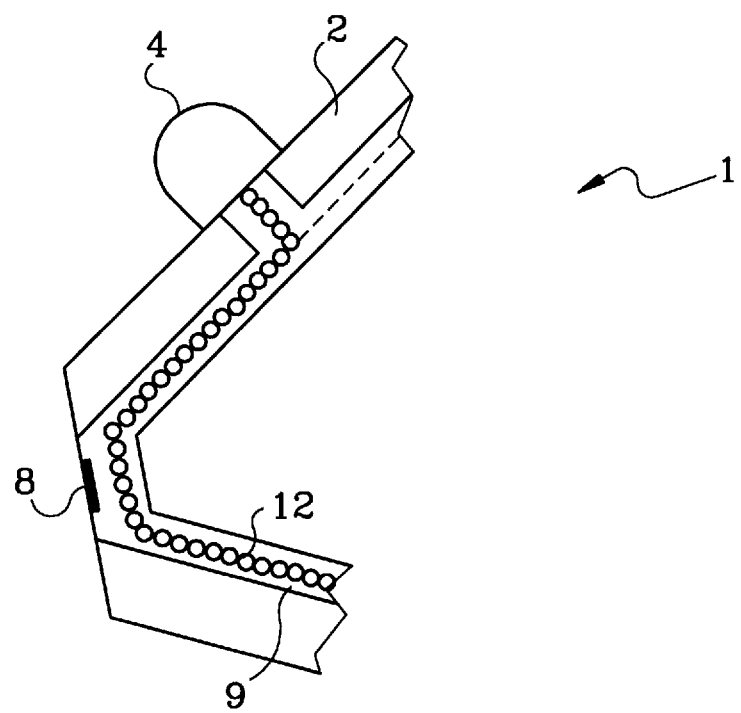
Figure 3D:
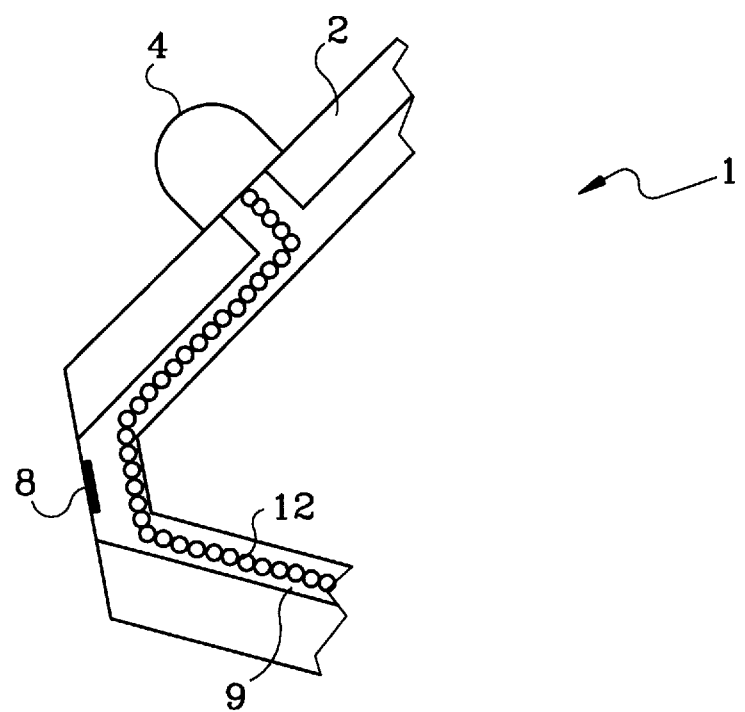

FIG. 3a shows an expanded view of the area with the mirror 8 and the plasma 12. This ring laser gyro 1 is tested with the mirror 8 placed an eighth of an inch away from the plasma 12. FIG. 3b has the ring laser gyro 1 tested with the mirror 8 a quarter inch away from the plasma 12. FIG. 3c has the ring laser gyro 1 tested with a distance of half an inch between the mirror 8 and the plasma 12 and FIG. 3d has the ring laser gyro 1 tested with a distance of an inch between the mirror 8 and the plasma 12.

Figure 4:
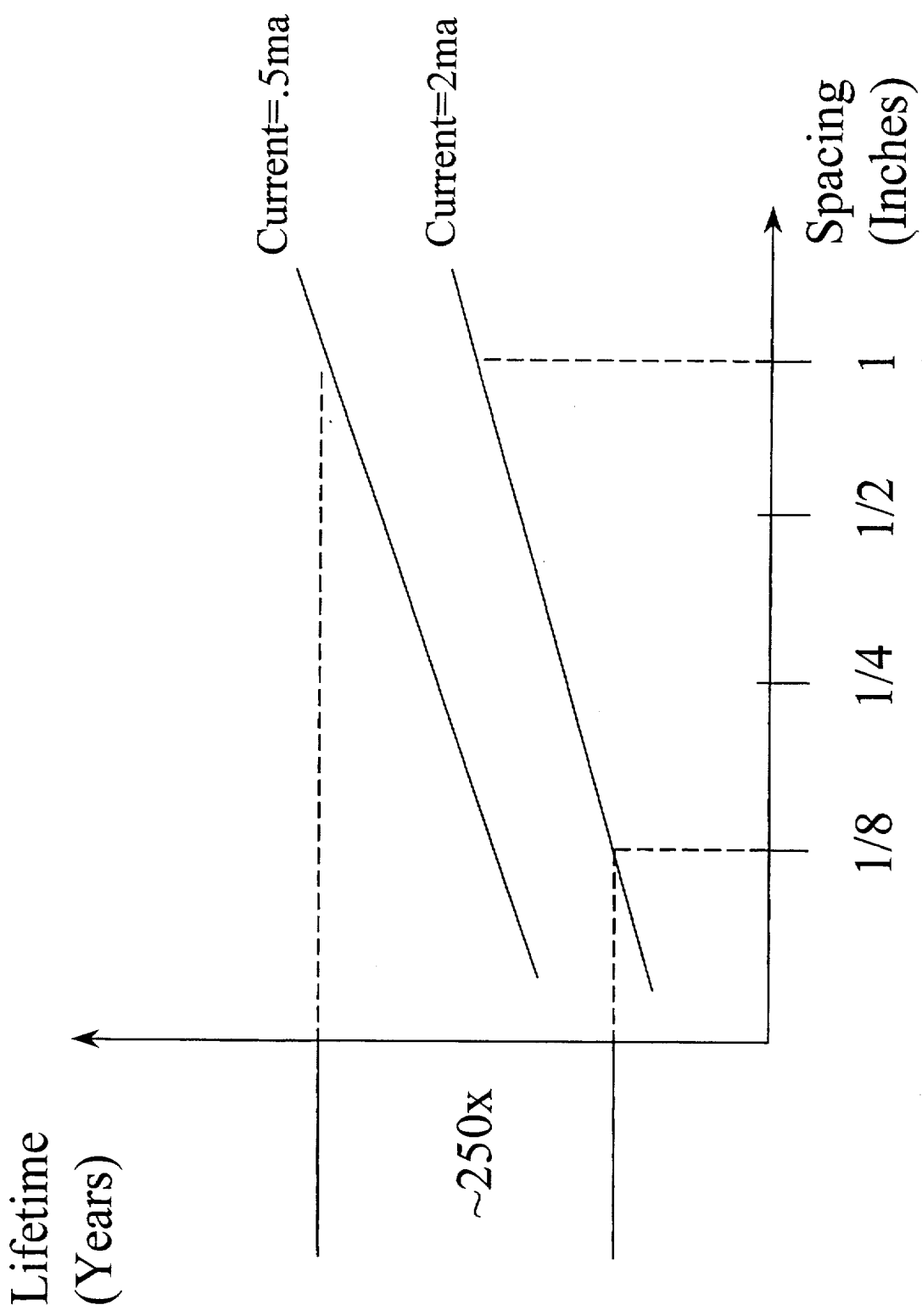
FIG. 4 shows the results from the accelerated test method of the present invention.

After each test is run, a graph is plotted. The X-axis would have the life of the gyro 1 tested and the Y-axis would have the distance between the plasma 12 and the mirrors 8 in the respective ring laser gyros 1. FIG. 4 shows the results of the testing of the ring laser gyro 1 with the present invention. This test method is far superior to the prior methods in that the time required for prediction of the life of the ring laser gyro 1 is reduced by a factor of 25. Again this test method is achieved by testing the ring laser gyro 1 with differing distances between the mirrors 8 and the plasma 12 at different plasma discharge currents. With these tests runs, it also would be possible to predict a desired mirror 8 distance from the plasma 12 and know approximately how long the life of the ring laser gyro 1 would be. This test is possible due to the approximate square law relationship between the ring laser gyro life and the distance between the mirror 8 and the plasma 12. The relationship is such that the difference in the distance between the test distance and a gyro design distance increases the life of the mirrors 8 by the distance ratio squared. Therefore, this accelerated testing saves much time and energy greatly shortens the test time compared to tests using only discharge current as the accelerating factor.

The distances between the mirrors 8 and the plasma 12 used for testing described above are merely examples used for the preferred embodiment. However, the distances are not limited to these values and many other distances can be used to perform the accelerated testing of the present invention. Also, the number of tests performed is only an example of the preferred embodiment, but any number of tests at different distances can be performed as long as enough data exists for determining gyro life. Further, the current used in the tests could be changed and is not constrained to approximately 1 ma, but could range, for example, between 0.5 ma and 8 ma. Running the current at differing values of course will determine the ring laser gyro life at that current value and will allow extrapolation to the value of current used in the actual device.

The invention has been described herein in considerable detail in order to comply with the Patent Statutes and to provide those skilled in the art with the information needed to apply the novel principles and to construct and use such specialized materials and components as are required. However, it is to be understood that the invention can be carried out by specifically different materials and components, and that various modifications, both as to the processing details and operating procedures, can be accomplished without departing from the scope of the invention itself.

The embodiments of the invention in which an exclusive property or right is claimed are defined as follows:

1. A method of testing at a constant the environment of mirrors near plasma in a ring laser gyro, comprising the steps of:
   a) testing a ring laser gyro wherein the mirror is a predetermined distance from the plasma; and
   b) continuing step a) with a plurality of other ring laser gyros, with mirrors in each of the plurality of ring laser gyros at different predetermined distances from the plasma.

2. The method of claim 1 wherein the predetermined distance is an eighth of an inch.

3. The method of claim 1 wherein step a) is performed four times.

4. The method of claim 1 wherein a different distance is half an inch.

5. The method of claim 1 wherein a different distance is a quarter of an inch.

6. The method of claim 1 wherein a different distance is an inch.

7. The method of claim 1, further comprising the step of;
   c) graphing life of the ring laser gyro based on the distance between the mirror and the plasma.

8. The method of claim 7, further comprising the step of:
   d) predicting the life of a ring laser gyro based on step c).

9. A method of testing the environment of mirrors near plasma in a ring laser gyro, comprising the steps of:
   a) testing a ring laser gyro wherein the mirror is a first distance from the plasma;
   b) testing a ring laser gyro wherein the mirror is a second distance from the plasma;
   c) testing a ring laser gyro wherein the mirror is a third distance from the plasma; and
   d) testing a ring laser gyro wherein the mirror is a fourth distance from the plasma.

10. The method of claim 9, further comprising the step of:
    e) graphing life of the ring laser gyro based on the distance between the mirror and the plasma.

11. The method of claim 10, further comprising the step of:
    f) predicting the life of a ring laser gyro based on step e).

12. A method of testing the environment of mirrors near plasma in a ring laser gyro, comprising the steps of:
    a) testing a ring laser gyro by applying a current to the ring laser gyro wherein the mirror is a first distance from the plasma;
    b) testing a ring laser gyro by applying a current to the ring laser gyro wherein the mirror is a second distance from the plasma;
    c) testing a ring laser gyro by applying a current to the ring laser gyro wherein the mirror is a third distance from the plasma; and
    d) testing a ring laser gyro by applying a current to the ring laser gyro wherein the mirror is a fourth distance from the plasma.

13. The method of claim 12, further comprising the step of:
    e) graphing life of the ring laser gyro based on the distance and the current.

14. The method of claim 13, further comprising the step of:
    f) predicting the life of a ring laser gyro based on step e).

15. A method of testing the environment of mirrors near plasma in a ring laser gyro, comprising the steps of:
    a) testing a ring laser gyro by applying a current to the ring laser gyro wherein the mirror is a predetermined distance from the plasma; and
    b) continuing step a) with a plurality of other ring laser gyros, with mirrors in each of the plurality of ring laser gyros at different predetermined distances from the plasma.

16. The method of claim 15 wherein the predetermined distance is an eighth of an inch.

17. The method of claim 15 wherein step a) is performed four times.

18. The method of claim 15 wherein a different distance is half an inch.

19. The method of claim 15 wherein a different distance is a quarter of an inch.

20. The method of claim 15 wherein a different distance is an inch.

21. The method of claim 15, further comprising the step of:
    c) graphing life of the ring laser gyro based on the distance between the mirror and the plasma.

22. The method of claim 21, further comprising the step of:
    d) predicting the life of a ring laser gyro based on step c).

23. The method of claim 15, further comprising the step of:
    c) graphing life of the ring laser gyro based on the distance and the current.

24. The method of claim 15 wherein a different current is applied to the ring laser gyro at each different predetermined distance.

* * * * *

UNITED STATES PATENT AND TRADEMARK OFFICE
CERTIFICATE OF CORRECTION

PATENT NO. : 5,818,591
DATED : October 16, 1998
INVENTOR(S) : Steven C. Albers, Timothy J. Callaghan, Rodney H. Thorland Page 1 of 2

It is certified that error appears in the above-identified patent and that said Letters Patent is hereby corrected as shown below:

In the Abstract, line 4, cancel "of" and substitute --in--.

In the Drawing on the first page of the patent, 25x should be ~250x, as shown on attached Figure 4 of this Certificate of Correction.

In the Drawing on the first page of the patent, .2ma should be 2ma, as shown on attached Figure 4 of this Certificate of Correction.

In the Drawings, Sheet 7, Figure 4, 25x should be ~250x, as shown on attached Figure 4 of this Certificate of Correction.

In the Drawings, Sheet 7, Figure 4, .2ma should be 2ma, as shown on attached Figure 4 of this Certificate of Correction.

Column 1, line 40, cancel "testing of" and substitute --testing in--.

Column 2, line 27, cancel "25" and substitute --~250--.

In the Claims, Claim 1, line 1, cancel "at" and substitute --,in--.
    line 1, cancel "the" and substitute --internal--.
    line 1, cancel "of" and substitute --,--.

In the Claims, Claim 9, line 1, cancel "the" and substitute --,in a constant internal--.
    line 1, cancel "of" and substitute --,--.

In the Claims, Claim 12, line 1, cancel "the" and substitute --,in a constant internal--.
    line 1, cancel "of" and substitute --,--.

In the Claims, Claim 15, line 1, cancel "the" and substitute --,in a constant internal--.
    line 1, cancel "of" and substitute --,--.

Signed and Sealed this

Fourth Day of May, 1999

Attest:

Attesting Officer

Q. TODD DICKINSON

Acting Commissioner of Patents and Trademarks